United States Patent
Condorovici et al.

(10) Patent No.: US 10,298,949 B2
(45) Date of Patent: May 21, 2019

(54) METHOD AND APPARATUS FOR PRODUCING A VIDEO STREAM

(71) Applicant: FotoNation Limited, Galway (IE)

(72) Inventors: Razvan G. Condorovici, Bucharest (RO); Cosmin Stan, Bucharest (RO); Ilinca Dobre, Bucharest (RO)

(73) Assignee: FotoNation Limited, Galway (IE)

( * ) Notice: Subject to any disclaimer, the term of this patent is extended or adjusted under 35 U.S.C. 154(b) by 134 days.

(21) Appl. No.: 15/141,637

(22) Filed: Apr. 28, 2016

(65) Prior Publication Data

US 2016/0323596 A1 Nov. 3, 2016

Related U.S. Application Data

(60) Provisional application No. 62/155,310, filed on Apr. 30, 2015.

(51) Int. Cl.
| | |
|---|---|
| *H04N 7/12* | (2006.01) |
| *H04N 19/51* | (2014.01) |
| *G06T 5/00* | (2006.01) |
| *G06T 5/50* | (2006.01) |
| *H04N 5/232* | (2006.01) |

(52) U.S. Cl.
CPC ............ *H04N 19/51* (2014.11); *G06T 5/002* (2013.01); *G06T 5/003* (2013.01); *G06T 5/50* (2013.01); *H04N 5/232* (2013.01); *G06T 2207/10016* (2013.01); *G06T 2207/10148* (2013.01); *G06T 2207/20201* (2013.01); *G06T 2207/20208* (2013.01)

(58) Field of Classification Search
CPC . G06T 2207/10016; G06T 2207/10148; G06T 2207/20201; G06T 2207/20208; G06T 5/002; G06T 5/003; G06T 5/50; H04N 19/51; H04N 5/232
USPC ......................................... 375/240.01–240.29
See application file for complete search history.

(56) References Cited

U.S. PATENT DOCUMENTS

| | | | |
|---|---|---|---|
| 2009/0303343 A1* | 12/2009 | Drimbarean ............ | G06T 5/009 348/222.1 |
| 2017/0034429 A1* | 2/2017 | Huysegems ....... | H04N 5/23232 |

FOREIGN PATENT DOCUMENTS

| | | | | |
|---|---|---|---|---|
| EP | 2933999 | * 10/2015 | ............. | H04N 5/232 |
| WO | WO2014146983 | 9/2014 | | |

OTHER PUBLICATIONS

High Dynamic Range Video with HDRX—http://www.red.com/learn/red-101/hrdx-high-dynamic-range-video; p. 1-7.
"Reel Smart Motion Blur in Action" http://revisionfx.com/products/rsmb/overview/; p. 1-3.

(Continued)

*Primary Examiner* — Farzana Hossain (57) ABSTRACT

A method of processing a stream of images comprises obtaining an image of a scene with a relatively short exposure time (SET) and obtaining an image of the same scene with a relatively longer exposure time (LET). Motion blur characteristics for the SET image corresponding to motion within the LET image are determined and the motion blur characteristics are applied to the SET image. The blurred SET image and the LET image are blended to provide a HDR image. The process is repeated for successive pairs of images in the stream to provide a sequence of HDR images which can be encoded in a video stream.

10 Claims, 6 Drawing Sheets

(56) References Cited

OTHER PUBLICATIONS

"Reel Smart Motion Blur" http://www.revisionfx.com/products/rsmb/overview/; 2015, p. 1-2.
"ReelSmart Motion Blur in Action" http://www.revisionfx.com:80/products/rsmbi; 2016, p. 1-2.
"High Dynamic Range Video with HDRX" http://www.red.com/learn/red-101/hdrx-high-dynamic-range-video; 2016, p. 1-8.
"High Dynamic Range Video with HDRX" http://www.red.com/learn/red-101/hdrx-high-dynamic-range-video; 2015. page 1-8.

* cited by examiner

METHOD AND APPARATUS FOR PRODUCING A VIDEO STREAM

FIELD

The present invention relates to a method and apparatus for producing a video stream.

BACKGROUND

It is known when capturing a sequence of images of a scene which are to be combined into a video stream that motion of an object within the field of view can cause problems with the perceived quality of the video stream.

Figure 1A:
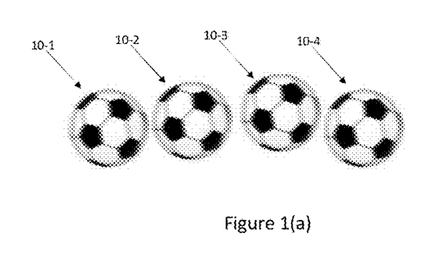
FIGS. 1(a) and 1(b) illustrate objection motion within a scene.

Referring to FIG. 1(a), in a brightly lit scene, each frame can be captured at say 24 fps with a short exposure time (SET), say 1/500s, and so an object such as a football in this case will be captured as a sharp image portion at a sequence of discrete locations within each frame. In FIG. 1(a), numerals, 10-1 . . . 10-4 indicate the position of a ball moving across a scene in a sequence of four SET frames. When a video stream including frames acquired in this fashion is played, the motion of the ball will appear disjointed and unnatural.

Figure 1B:
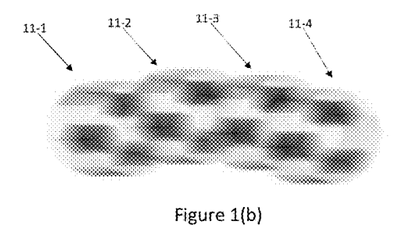

Referring to FIG. 1(b), if on the other hand, each frame is captured with a longer exposure time (LET), say 1/50s, then although motion of the ball through frames 11-1 . . . 11-4 will appear smoother, the scene will tend to be overexposed with many saturated areas and so loss of image detail.

Even in an acquisition device with variable aperture, closing down the aperture rather than speeding up exposure time to solve motion problems would cause problems with depth of field.

Separately, it is known to use Neutral Density Filters to reduce the amount of light entering the lens, so increasing exposure time and introducing blur into video frames. However, good quality neutral density filters are expensive, they cannot be added to any kind of camera, and they are not designed to be used by casual users.

ReelSmart Motion Blur (http://www.revisionfx.com/products/rsmb/overview/) introduces motion blur into images which have been acquired with a relatively short exposure time, but this does not address problems with scenes which require a high dynamic range and so leads to problems with underexposure or saturation.

High Dynamic Range (HDR) images are typically generated by acquiring multiple component images of a scene, each with different exposure levels, and then later, merging the component images into a single HDR image. This is a useful way of synthesizing an image of a scene comprising very dark and very bright regions.

HDRx from Red.com, Inc. (http://www.red.com/learn/red-101/hdrx-high-dynamic-range-video) includes a "Magic Motion" facility which interprets different motion blur characteristics from a pair of frame sequences, each simultaneously acquired with different exposure times, and then blends them together under user-control.

SUMMARY

According to a first aspect, there is provided a method of processing a stream of images according to claim 1.

This aspect provides a method for automatically combining sequences of frames acquired with different exposure times into a video stream with high dynamic range and with natural motion blur.

Embodiments of this aspect capture a pair of frame sequences including relatively lighter, longer exposure time (LET) frames which tend to be susceptible to motion blur and relatively darker, sharper, shorter exposure time (SET) frames. Motion is evaluated for each frame and synthetic motion blur is added to the SET frames before the SET and LET frames are combined to produce a high dynamic range (HDR) video sequence with natural motion blur.

According to a second aspect, there is provided a method of producing a video stream according to claim 11.

This aspect provides an effective mechanism for applying motion blur to images within a sequence of images.

Further aspects provide respective apparatus for performing the above methods.

In some embodiments motion is estimated between pairs of SET image frames of a given scene.

BRIEF DESCRIPTION OF THE DRAWINGS

Various embodiments of the invention will now be described, by way of example, with reference to the accompanying drawings, in which.

DESCRIPTION OF THE EMBODIMENTS

Figure 2:
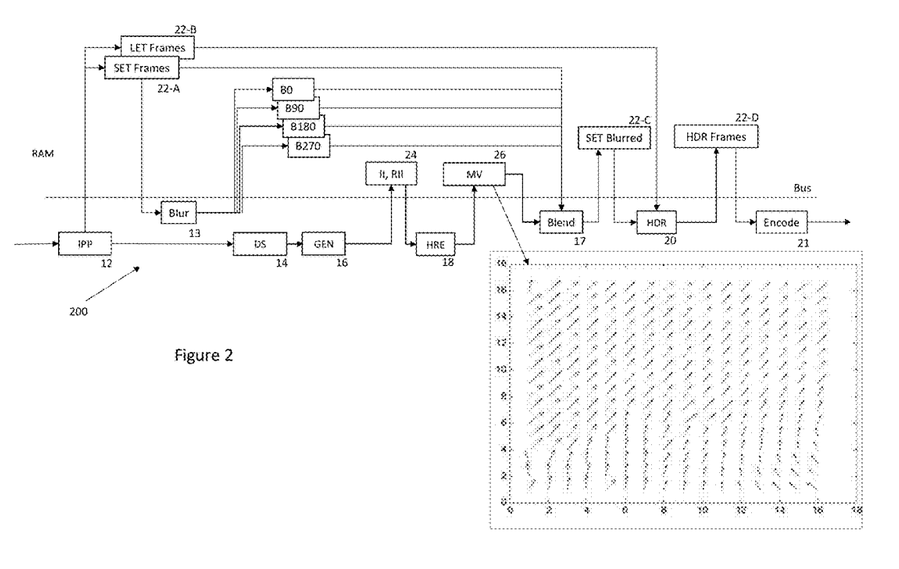
FIG. 2 is a block diagram of an apparatus for producing a video stream according to an embodiment of the present invention.

Referring now to FIG. 2, there is shown schematically an apparatus 200 for producing a video stream according to an embodiment of the present invention. The apparatus 200 includes a bus 300 which allows image processing modules 12-21 (shown below the bus) to read and write information to memory 22-26 (shown above the bus). It should be noted that the modules 12-21 can also incorporate local memory to facilitate internal processing.

Image frames are acquired by an image processing pipeline (IPP) 12 from an image sensor (not shown) and written to memory, typically at a frame rate from 24 fps up to from 60 fps to even 240 fps. In the embodiment, for each frame, a pair of images are acquired, one for a short exposure time (SET) and one for a relatively longer exposure time (LET). The exact exposure times can be chosen as a function of the scene illumination and may vary across a sequence, but the difference between the SET and the LET means that a moving object will be captured sharply in one whereas it will be subject to motion blur in the other. Typically, the SET and LET image frames are acquired by reading image sensor values after the SET and, without clearing sensor values, continuing to expose the image sensor until the LET at which time LET image values are read. In the example, SET image values are written to a frame buffer 22-A and LET image values are written to a frame buffer 22-B. As explained, SET image frames tend to be dark but sharp, whereas LET image frame tend to be bright and naturally blurred.

It will be appreciated that if SET and LET image frames were to be captured successively that artefacts such as ghosting might tend to appear in the frames of the final video stream.

In this embodiment, the apparatus is arranged to determine a motion vector 26 between successive SET image frames. It will nonetheless be appreciated that the motion vector may not need to be determined between immediately temporally adjacent SET image frames, but they should nonetheless be acquired relatively close to one another. Also, the motion vector for a given SET image could be determined across more than two images. One suitable technique for determining a motion vector is disclosed in WO2014/146983. Using this technique, a down sampler (DS) 14 acquires information for successive SET image frames from the IPP 12. (This can also be acquired from the frame buffer 22-A if there is no direct connection to the IPP 12.) The down sampler 14 may for example be a Gaussian downsampler of the type provided by Fujitsu. The down-sampled image information is fed to an integral image (II) generator (GEN) 16 which writes the II for an image frame to memory 24. Calculation of integral image is well known and was originally disclosed by Viola, P. and Jones, M. in "Rapid Object Detection using a Boosted Cascade of Simple Features", Computer Vision and Pattern Recognition, 2001, Volume 1. As will be appreciated, only an intensity version of the original SET image is required to provide an integral image. This could be a grey scale version of the image, or it could be any single plane of a multi-plane image format, for example, RGB, LAB, YCC etc.

A hierarchical registration engine (HRE) 18 such as disclosed in WO2014/146983 reads integral image information for a pair of SET frames from memory 24 and by correlating the two images, generates a displacement map 26 for the image pair. An exemplary displacement map is shown in detail in FIG. 2 and each location of the map indicates motion direction and magnitude for the corresponding location of an SET image frame. For this reason, the displacement map is also referred to as a motion vector (MV) in the present specification.

In the approach disclosed in WO2014/146983, a reduced integral image (RII) is also obtained for every second down-sampled SET image frame and the motion vector 26 is determined using an II for one image and an RII for an adjacent image frame.

In the embodiment of FIG. 2, the motion vector 26 for each SET image frame is used by separate blur 13 and blending 17 modules, which are explained in more detail below, to provide a blurred version of each SET frame and blurred SET frames are stored in buffer 22-C. It will nonetheless be appreciated that a blurred SET frame could also be produced by a single blur module.

Figure 3:
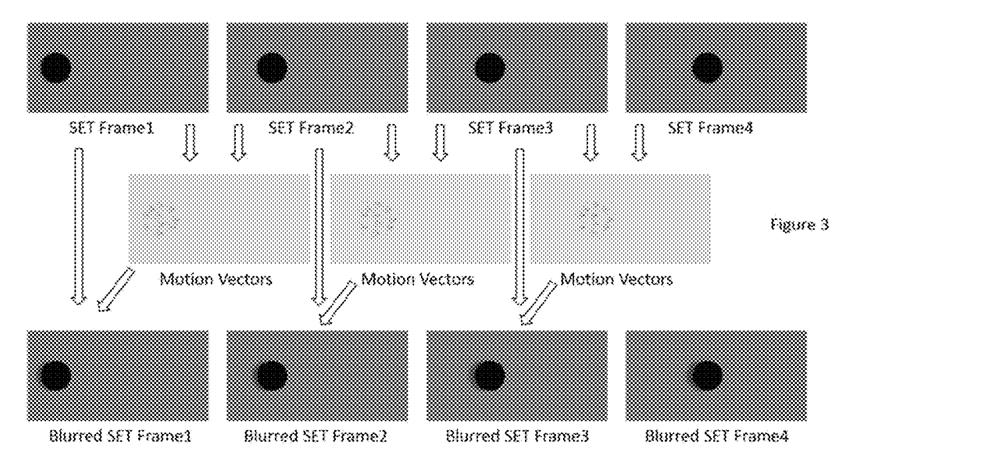
FIG. 3 illustrates graphically the blurring of successive SET frames according to an embodiment of the invention.

Referring to FIG. 3, it will thus be seen that in FIG. 2, frame information from SET Frame N and SET Frame N+1 is combined to generate a motion vector and the motion vector is combined with SET Frame N to generate a blurred SET frame N. It will be seen from FIG. 3 that each blurred SET frame should now include the same content, albeit darker than the corresponding LET frame.

Referring back to FIG. 2, a HDR module 20 then combines each blurred SET frame within the buffer 22-C with a corresponding (naturally blurred) LET frame from the buffer 22-B to provide a high dynamic range, naturally blurred set of image frames which are stored in buffer 22-D. In a simple implementation, a simple alpha blending between the blurred SET and LET image frames, using luminance as a map, will generate artefact free HDR image frames.

The HDR frames can then be processed by a conventional type video encoder 21 to produce a video stream which can be displayed or stored on the acquisition device or transmitted to a remote device (not shown) in a conventional fashion.

It will be appreciated however, that the motion vector for each pixel of an image produced by the HRE module 18 can vary in angle and magnitude and so it could be extremely processor intensive to generate a unique blurring kernel for each SET frame pixel to take into account the motion vector for the pixel. On the other hand, if a per pixel blurring kernel were not generated for example, if kernels were only generated for blocks of pixels, then blurring artefacts could be visible within the final HDR image frame.

Figure 5:
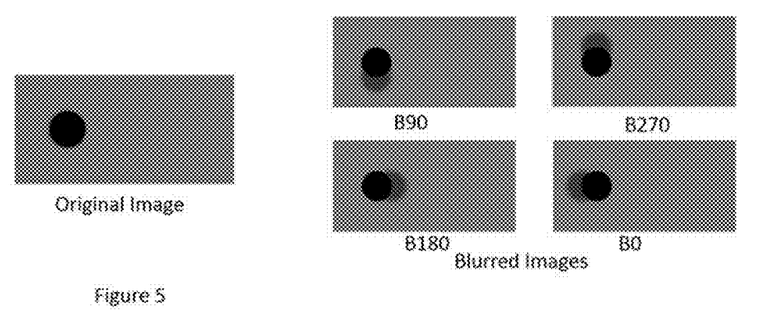
FIG. 5 shows a set of blurred images generated from a single SET frame according to an embodiment of the invention.

In an embodiment of the present invention, the blurring module 13 generates four blurred versions of each SET frame: B0, B90, B180, B270, each blurred by a set amount B in a respective cardinal direction 0°, 90°, 180° and 270°. As indicated in FIG. 5, each blurred version of the original image corresponds to the original image blurred by the set amount B in each of the four cardinal directions.

The original image from buffer 22-A, the four blurred images B0, B90, B180, B270 and the motion vector MV for an SET frame are fed to the blending module 17 to produce a blurred version of the SET frame.

Figure 4:
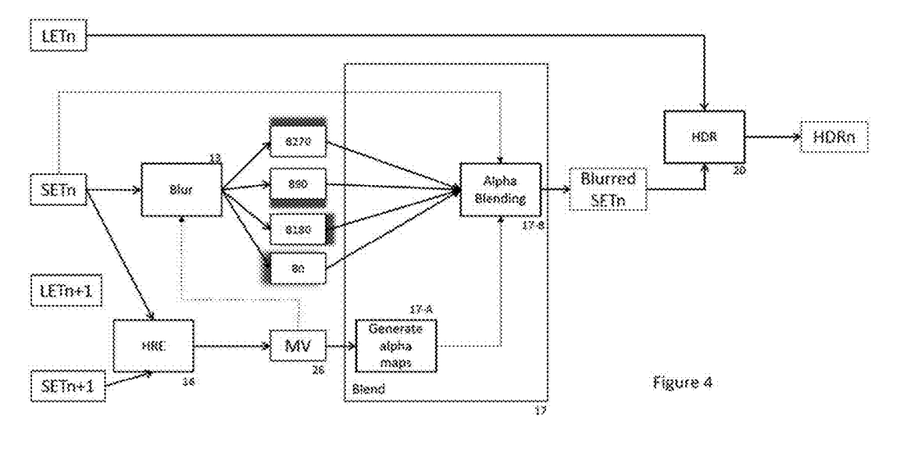
FIG. 4 illustrates in more detail the blurring and blending modules of the apparatus of FIG. 2.

Referring now to FIG. 4, the blending module 17 includes two main components: a blending parameter generator 17-A; and a blender 17-B. For each motion vector, the blending parameter generator 17—A produces a set of parameters α, β, γ, δ for each pixel of the image; the per pixel blending parameters are then used to determine how pixel information from the four blurred images B0, B90, B180, B270 is combined with the pixel information from the original SET image frame to produce a pixel value for the blurred SET image frame.

Calculation of the blending parameters is based on the observation that the motion vector at any given pixel MV is a linear combination of motion in the four cardinal directions:

$$MV=\alpha*B0+\beta*B90+\gamma*B180+\delta*B270$$

Figure 6:
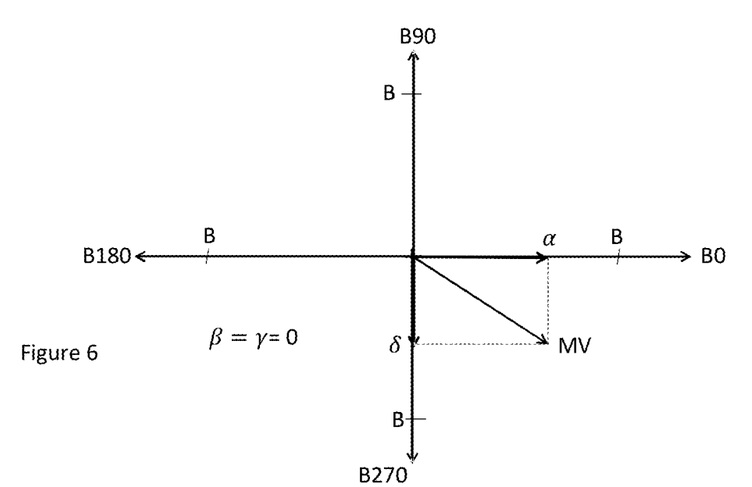
FIG. 6 illustrates the blending parameters for combining the images of FIG. 5 to generate a blurred SET image frame for use within the apparatus of FIG. 2.

It will be appreciated that there is no advantage to adding blur components from diametrically opposing blurred images, so: $\alpha*\gamma=0$; $\beta*\delta=0$. Thus, for a MV value in each quadrant, two of the blending parameters will be zero valued as in the case of β and γ in FIG. 6; while the other two parameters α and δ, in the example of FIG. 6, will comprise the horizontal and vertical components respectively of the motion vector for the quadrant.

An equal blend of the original image and the blurred images gives a pixel value for the blurred image as follows:

Blurred=¼(α*B0+(1−α)*Orig+β*B90+(1−β)*Orig+ γ*B180+(1−γ) *Orig+δ*B270+(1−δ)*Orig)

This in turn simplifies to:

$$\text{Blurred} = \frac{\alpha*B0 + \beta*B90 + \gamma*B180 + \delta*B270}{4} + \text{Original}\left(1 - \frac{\alpha+\beta+\gamma+\delta}{4}\right)$$

Nonetheless, it will be appreciated that in variants of this approach, the blurred image can be more weighted towards either the original SET image or towards the blurred images; or indeed towards a specific one of the blurred images.

Also, in other variants different combinations of blurred images can be employed at angles other than at the cardinal directions.

It will be appreciated that this technique works well as long as the actual motion blur for a LET image is less than the fixed blur B for the images B0 to B270. Actual motion blur depends on several factors:

The value of LET;
The focal length of the lens;
The distance from sensor to the moving object;
The speed of the moving object; and
The size of the sensor.

Note that if B is chosen too large, the approximation used in such an embodiment might provide undesirable artefacts in the blurred SET image frame. The value for B can be determined experimentally, but it does not have to remain static for a complete video sequence.

In some embodiments, several predefined modes can be available, for example: High Speed Motion, Normal Scene, Static Scene. The blurring module 13 could choose between each of these three (or more) pre-sets by determining a maximum magnitude of the motion vector 26 from time to time, for example, every 2 seconds. Each of the three pre-sets would have an associated blur B size, tuned for the image sensor and based at least on its resolution. In other embodiments, B could vary in proportion to the difference between LET and SET for a corresponding pair of image frames.

It will be appreciated that while the above embodiments have been described in terms of a pair of SET and LET image streams, in other embodiments of the invention, more than two image streams may be employed, so providing, for example, a nominally exposed image stream; an underexposed image stream; and an overexposed image stream. While this may require differential blurring of both the underexposed and nominally exposed image streams so that they match the content of the overexposed image stream, it may provide for better quality HDR image frames. For both a two stream and multiple stream embodiments, the adjustment to exposure time can be determined as disclosed in U.S. Patent Application No. 62/147,464 filed 14 Apr. 2015 and entitled "Image Acquisition Method and Apparatus".

The invention claimed is:

1. A method of processing a stream of images comprising:
   a) obtaining an image frame of a scene with a relatively short exposure time (SET), the SET image frame comprising a first image;
   b) obtaining an image frame of the same scene with a relatively longer exposure time (LET);
   c) determining motion blur characteristics for the SET image frame corresponding to motion within the LET image frame, said determining motion blur characteristics comprising determining a motion vector indicating motion between said SET image and a temporally adjacent SET image;
   d) applying the motion blur characteristics to blur the first image of the SET image frame in a pre-determined number of directions to provide multiple blurred versions of the first image wherein said applying the motion blur characteristics to the first image comprises, for each pixel;
      determining, according to the motion vector for the pixel, a blending component corresponding to each blurred version of said first image; and
      combining corresponding pixel values of said SET image frame and each of said blurred versions of said first image according to said blending components to provide a blurred SET image frame;
   e) blending the blurred SET image frame and the LET image frame to provide a High Dynamic Range image frame; and
   f) repeating steps a) to e) for successive pairs of images in said stream.

2. A method according to claim 1 wherein exposure for said SET image and said LET image begins at the same time.

3. A method according to claim 1 wherein said determining a motion blur characteristic comprises correlating said SET image with a temporally adjacent SET image to determine a relative movement of pixel information between said SET image and said temporally adjacent SET image, said motion blur characteristic comprising a motion magnitude and a motion direction for each pixel of the SET image.

4. A method according to claim 3 wherein said temporally adjacent SET image is a successive image.

5. A method according to claim 1 wherein said determining motion blur characteristics comprises determining a plurality of pixel-by-pixel motion vectors indicating motion between said SET image and a temporally adjacent SET image, said motion vectors each comprising a motion magnitude and a motion direction for each pixel of the SET image.

6. A method according to claim 1, wherein the motion blur characteristics are applied to blur the first image of the SET image frame by a fixed amount in the pre-determined number of directions to provide the multiple blurred visions of the first image.

7. A method according to claim 1 wherein, for each pixel associated with the SET image frame, said number of directions are four cardinal direction 0°, 90°, 180° and 270° and there are four blurred versions of the first image, each blurred version having, respectively, an associated blending component $\alpha$, $\beta$, $\gamma$, $\delta$ which components are determinative of how, when combining said corresponding pixel values for said pixel, pixel information from the multiple blurred versions of the first image are combined with pixel imformation form the first image of the SET image frame to produce a pixel value for the blurred SET image frame.

8. A method according to claim 7 wherein said combining for each said pixel is a blend of the first image pixel value and the pixel value of each blurred version of the first image to provide the corresponding pixel value for the blurred SET image frame:

$$\frac{\alpha*B0 + \beta*B90 + \gamma*B180 + \delta*B270}{4} + \text{Original}\left(1 - \frac{\alpha+\beta+\gamma+\delta}{4}\right)$$

where B0, B90, B180 and B270 each comprise pixel information for said pixel from one of the blurred images; and Original comprises pixel information for said pixel from the first image.

9. A method according to claim 7 wherein $\alpha*\gamma=0$; and $\beta*\delta=0$.

10. A method according to claim 6 wherein said fixed amount is at least as large as a largest motion magnitude component for the SET image frame.

* * * * *